United States Patent
Cheng

(10) Patent No.: US 7,441,116 B2
(45) Date of Patent: Oct. 21, 2008

(54) SECURE RESOURCE DISTRIBUTION THROUGH ENCRYPTED POINTERS

(75) Inventor: Li-Te Cheng, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 752 days.

(21) Appl. No.: 10/331,398

(22) Filed: Dec. 30, 2002

(65) Prior Publication Data

US 2004/0128535 A1    Jul. 1, 2004

(51) Int. Cl.
*H04L 9/00* (2006.01)
*H04L 9/32* (2006.01)
*H04K 1/00* (2006.01)
*G06F 15/16* (2006.01)

(52) U.S. Cl. .......... 713/162; 713/193; 380/45; 380/259; 380/277; 380/282; 726/28; 705/75; 705/76; 709/245; 709/227; 709/228

(58) Field of Classification Search .......... 380/45, 380/259, 277, 282; 713/162, 193; 726/28; 705/75–76; 709/245, 227–228
See application file for complete search history.

(56) References Cited

U.S. PATENT DOCUMENTS

| | | | | |
|---|---|---|---|---|
| 5,966,441 | A * | 10/1999 | Calamera | 713/167 |
| 6,098,056 | A * | 8/2000 | Rusnak et al. | 705/75 |
| 6,108,656 | A * | 8/2000 | Durst et al. | 707/10 |
| 6,633,915 | B1 * | 10/2003 | Hashimoto | 709/228 |
| 6,691,232 | B1 * | 2/2004 | Wood et al. | 726/6 |
| 6,775,772 | B1 * | 8/2004 | Binding et al. | 713/171 |
| 6,891,953 | B1 * | 5/2005 | DeMello et al. | 380/277 |
| 7,073,199 | B1 * | 7/2006 | Raley | 726/26 |
| 7,185,205 | B2 * | 2/2007 | Launchbury et al. | 713/189 |
| 2003/0177387 | A1 * | 9/2003 | Osterwalder et al. | 713/201 |

(Continued)

FOREIGN PATENT DOCUMENTS

JP    2001325265    11/2001

(Continued)

OTHER PUBLICATIONS

V. Cardellini, et al., *The State of the Art in Locally Distributed Web-Server Systems*, ACM Computing Surveys, vol. 34, No. 2. pp. 263-274, (Jun. 2002).

(Continued)

*Primary Examiner*—Minh Dieu Nguyen
(74) *Attorney, Agent, or Firm*—Stephen T. Keohane, Esq.; Steven M. Greenberg, Esq.; Carey Rodriguez Greenberg & Paul LLP

(57) ABSTRACT

A secure pointer. The secure pointer can include an encrypted pointer to a resource disposed in a communicatively coupled computing device. The secure pointer also can include a network address of a server computing device able to locate the resource based upon a decrypted form of the encrypted pointer. Finally, the secure pointer can include an encrypted wrapper about the encrypted pointer and the network address. Notably, the encrypted pointer can be encrypted and decrypted according to a local encryption/decryption key known to the server computing device. Yet, the encrypted wrapper can be encrypted according to a public encryption key while the encrypted wrapper can be decrypted according to a private encryption key corresponding to the public encryption key.

8 Claims, 3 Drawing Sheets

U.S. PATENT DOCUMENTS

2003/0188181 A1* 10/2003 Kunitz et al. ............... 713/193
2004/0030741 A1* 2/2004 Wolton et al. ............... 709/202
2004/0123112 A1* 6/2004 Himmel et al. ............. 713/182
2006/0004772 A1* 1/2006 Hagan et al. ................ 707/10

FOREIGN PATENT DOCUMENTS

WO  WO 00/33232  6/2000
WO  WO 00/70511  11/2000

OTHER PUBLICATIONS

T. Hodes, et al., *An Architecture for Secure Wide-Area Service Discovery, Wireless Networks*, vol. 8, pp. 213-230, (2002).

R. Fielding, et al., *Principled Design of the Modern Web Architecture, ACM Transactions on Internet Technology*, vol. 2, No. 2, pp. 115-150, (May 2002).

Kikuchi, et al., *User Interface for a Digital Library to Support Construction of a "Virtual Personal Library"*, Proceedings of Multimedia '96, pp. 429-432, (1996).

A. Tan, *Personalized Information Management for Web Intelligence, 2002 IEEE*, pp. 1045-1050.

International Business Machines Corporation, *Method for defining and combining partial web pages, Research Disclosure*, pp. 1264-1269, (Jul. 2001).

* cited by examiner

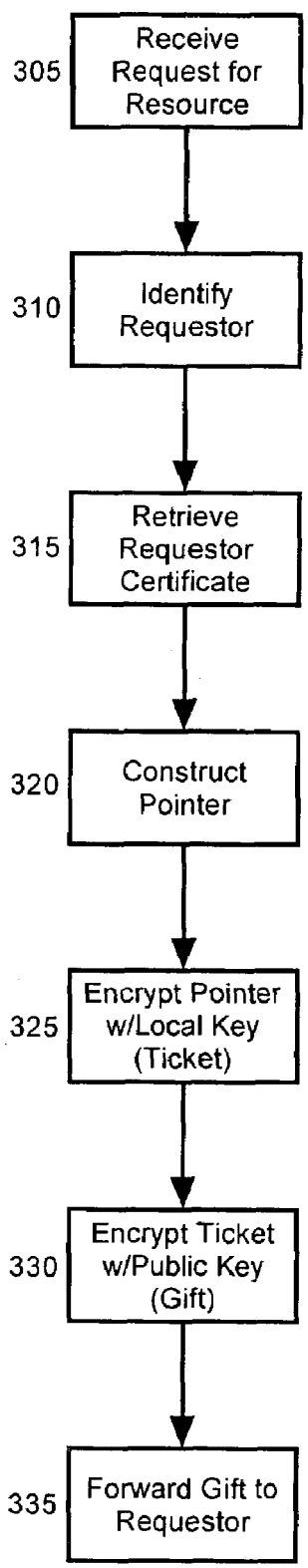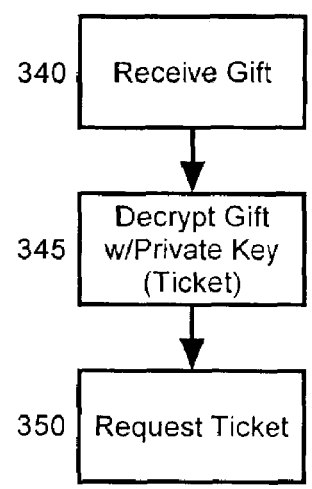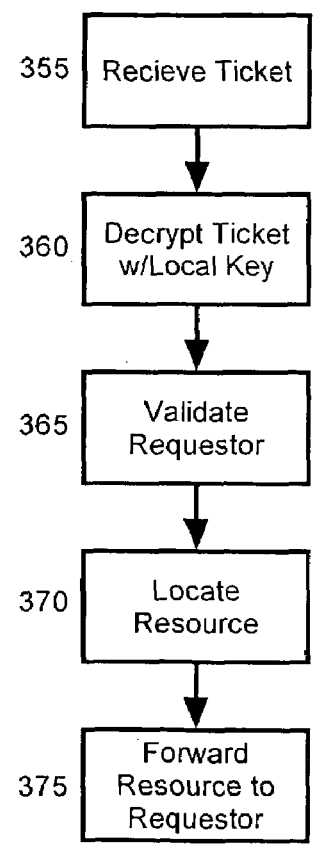
FIG. 3A
FIG. 3B
FIG. 3C

SECURE RESOURCE DISTRIBUTION THROUGH ENCRYPTED POINTERS

BACKGROUND OF THE INVENTION

1. Statement of the Technical Field

The present invention relates to the field of secure delivery of data over a computer communications network, and more particularly to the secure delivery of resources over the public Internet.

2. Description of the Related Art

The advent of network technologies and the Internet has given rise to extraordinary advances in interpersonal communications. Whereas conventional postal and courier services, telephony, teletype and facsimile technologies had previously provided the sole means of communications, network technologies, and particularly the Internet, has spawned an entirely more advanced and effective mode of communications. Examples of advanced network communications techniques include electronic mail, instant messaging and the various document transfer mechanisms such as the file transfer protocol. Still, the development of the functional World Wide Web in 1994 accelerated the rate at which individuals world wide relied upon the global Internet for interpersonal communications.

One important aspect of the World Wide Web includes document and data publishing and retrieval mechanisms. Prior to the World Wide Web, most document and data transfers occurred either over private communicative sessions over private telecommunications resources, or through public communicative services such as Archie, Gopher and Veronica. The World Wide Web, and more particularly, the hypertext transfer protocol (HTTP), however, provide a much simplified and more effective mechanism for sharing data.

Traditionally, the Uniform Resource Locator (URL) represents the resource access mechanism most utilized over the Internet. The global specification for the URL requires the statement of a network address, a resource location at the network address, and any optional parameters including protocol commands, parameters, and a payload. As will be recognized by one skilled in the art, a resource can include markup, a specific file or files, data, or programmatic logic.

In any case, to access data through the Internet using a URL, typically the desired resource and its respective location and a preferred command can be concatenated within a URL and transmitted to the destination device over the Internet. In HTTP, for instance, markup can be accessed through the following specification:

http_URL="http:" "/" host [":" port] [abs_path ["?" query]]

where the host is the domain name of the resource server, abs_path is the location within the resource server, query is an application specific command, as determined by the server.

While the naked use of the URL can suffice for public communications, the same cannot be said of private communications. For instance, where a Web accessible application involves the exchange of private data between client and server, unencrypted communications can either fall victim to one who might intercept the private data, or one who falsely masquerades as the client in order to obtain the private data. Of course, concerns with the malicious hacking of the server itself remain a paramount consideration in deploying an application to the World Wide Web. Consequently, several methods have been used in the past to secure private communications over the Internet.

For instance, a traditional means of delivering resources includes a folder-document URL technique in which resources can be structured at the server in a scheme which can be decoded by the client according to privately known information. Yet, to create such a scheme requires careful consideration in order to match a URL for every client. More importantly, the scheme can be easily reverse-engineered through careful study of the syntax within the URL itself. Thus, while the folder-document URL technique can suffice for generic access to public resources, the same cannot be said of secure access to private resources.

The programmatic URL technique represents another attempt at securing the confidentiality of data exchanged between client and server over the Internet. In the programmatic URL technique, HTTP POST or GET commands can provide parameterized identification data for the client which can be validated programmatically in the server. In this way, each customer can be uniquely and privately authenticated at the server. Still, to implement the programmatic URL technique, a consistent interface to the validation logic of the server must be exposed. Consequently, the interface can become conduit through which malicious hacking can be facilitated. As an example, the Code Red virus of the early twenty-first century exploited deficiencies in Web servers which had exposed an interface to a programmatic URL.

Secured Sockets Layer (SSL) technology, like the programmatic URL, provides a secure channel through which resources can be delivered from server to client. Still, SSL over secure HTTP (HTTPS) provides merely a secure channel and media for delivering a requested resource, rather than a secure pointer to the requested resource. Accordingly, like the programmatic URL, SSL over HTTPS, though a popular technology, suffers from the same deficiencies of the programmatic URL in as much as an interface must be exposed to support the validation logic of the server.

Cookies and tokens represent yet another popular technique for securing data communications between client and server. With cookie technology, authenticating data can be stored in the client and verified by the server during subsequent attempts to access secure data in the server. Cookie technology, however, can fail in the case of publicly accessible terminals and insecure computing devices used as the client where the security of the cookies themselves cannot be guaranteed. Tokens, by comparison, often combine cookies with programmatic URL technology to provide a more dynamic method of authenticating the client prior to exchanging sensitive data therewith.

Nevertheless, during the course of a transaction over the Internet, the token itself can be exposed and its integrity compromised. Also, to the extent that programmatic URLs are required to process the token, an unwanted interface must be exposed which can jeopardize the integrity of the server. Accordingly, there remains a long-felt unsolved need for securing access to resources over the publicly accessible Internet.

SUMMARY OF THE INVENTION

The present invention is a secure pointer to resources configured for distribution about a publicly accessible network. In securing a pointer to resources configured for distribution about the publicly accessible network, a pointer such as a URL can be "giftwrapped" through the encoding of a URL with an internal reference to the requested secure data. The encoded reference only can be decoded in the server and not in the client. Subsequently, the pointer can be encoded in association with a specific individual or client. Consequently, the pointer can be decoded only by the intended client. Where an authenticated client can decode the pointer, the client can return the still encoded reference to the server which then can decode the reference to provide access to the requested data to the client.

In a preferred aspect of the invention, a secure pointer can include an encrypted pointer to a resource disposed in a communicatively coupled computing device. The secure pointer also can include a network address of a server computing device able to locate the resource based upon a decrypted form of the encrypted pointer. Finally, the secure pointer can include an encrypted wrapper about the encrypted pointer and the network address. Notably, the encrypted pointer can be encrypted and decrypted according to a local encryption/decryption key known to the server computing device. Yet, the encrypted wrapper can be encrypted according to a public encryption key while the encrypted wrapper can be decrypted according to a private encryption key corresponding to the public encryption key.

The decrypted form of the encrypted pointer can include a message. The message can include, for instance, a location of the resource. The message further can include an identifier for a requester of the resource. In one alternative aspect of the invention, the decrypted form of the encrypted pointer yet further can include a usage policy for the resource. Finally, the decrypted form of the encrypted pointer can be encoded with markup tags specified according to the extensible markup language.

A method for securely distributing a requested resource to a requesting client over a computer communications network can include identifying a public encryption key for the requesting client and locating the requested resource. A pointer can be composed based upon the location and the composed pointer can be encrypted using a local encryption/decryption key. Subsequently, the encrypted pointer can be combined with a network address of a server coupled to a decoding processor configured to decrypt the encrypted pointer with the local encryption/decryption key. Finally, the combination can be encrypted with the public encryption key and the encrypted combination can be forwarded to the requesting client. In consequence, the requesting client both can decrypt the encrypted combination using a private encryption key corresponding to the public encryption key, and also can access the requested resource by transmitting the combination to the server coupled to the decoding processor.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a secure pointer which can be used to securely transfer a resource from server to client without incurring the risks associated with conventional means for secure data communications. Rather, in accordance with the inventive arrangements, a reference to the requested resource can be encrypted using a local key know only to the server. Subsequently, the encrypted reference can be packaged as a pointer to the reference, and yet further encrypted using a public encryption key for the requester, and the encrypted pointer can be forwarded to the requestor. Upon receipt, the requestor can decrypt the encrypted pointer using the private encryption key corresponding to the public encryption key, and can activate the pointer causing the transmission of the same to the server. Finally, the server can decrypt the received pointer to produce the reference.

Figure 1:
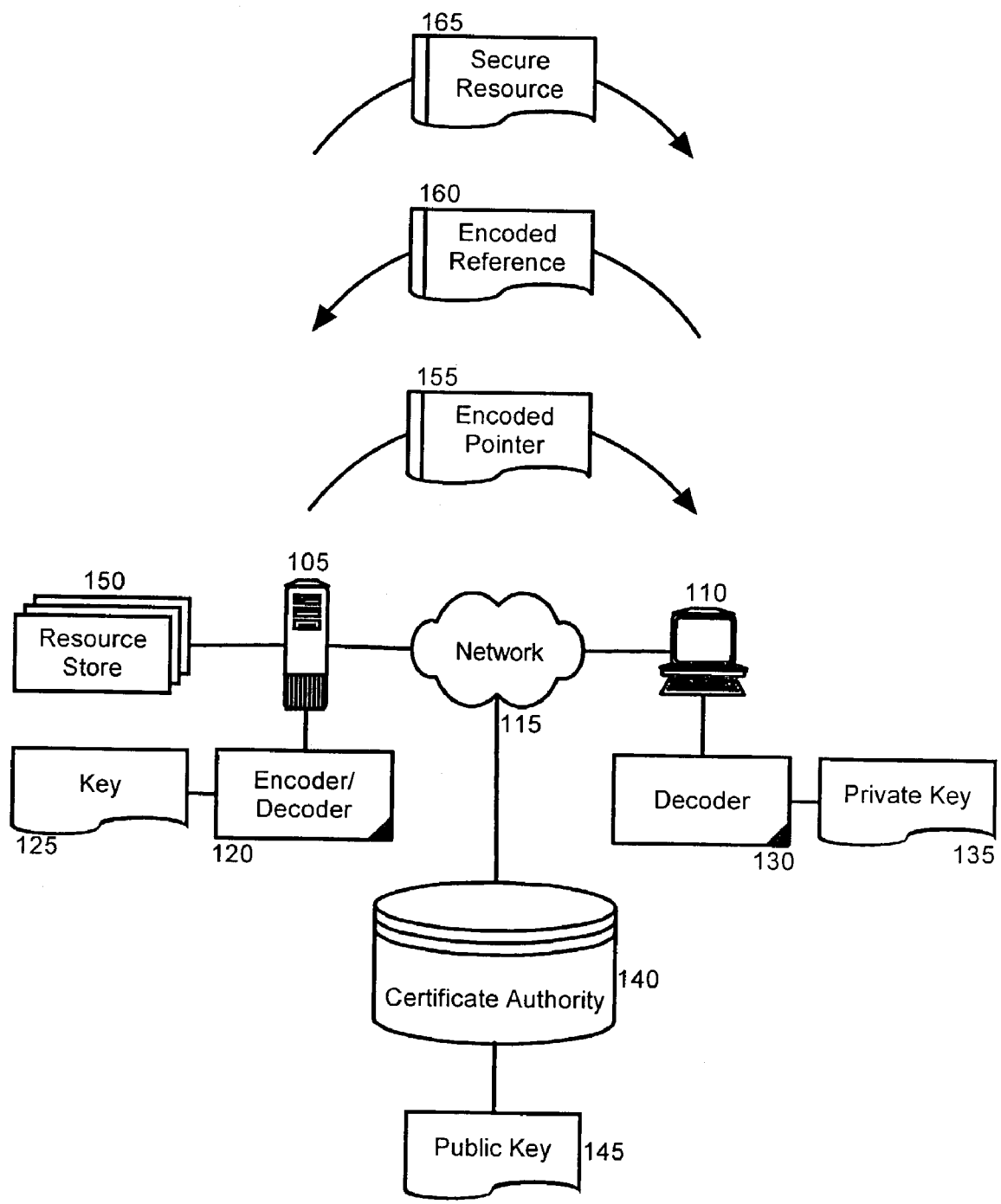
FIG. 1 is a pictorial illustration of a system configured for securely communicating data between client and server using the secure pointer of the present invention.

FIG. 1 is a pictorial illustration of a system configured for securely communicating data between client and server using the secure pointer of the present invention. The system can include a server computing device 105 communicatively coupled to a client computing device 110 over the computer communications network 115. The server computing device 105 can provide network access to any number of computing resources 150, such as markup, files, data, application logic, and the like. In that regard, the client computing device, through suitable application functionality such as a markup language browser, can request the transmission of a resource from among the computing resources 150 managed by the server computing device 105.

Responsive to receiving a request for a secure resource 165 from among the computing resources 150, an encoding/decoding process 120 within the server computing device 105 can identify the location of the secure resource 165 and can encrypt the location as a reference using the local key 125. Additionally, the encoding/decoding process 120 can retrieve a public encryption key 145 for the client computing device 110 from a communicatively coupled certificate authority 140. Using the public encryption key 145, the encoding/decoding process 120 can encrypt the reference and can concatenate the encrypted reference with a network address of the server computing device 105 to produce an encoded pointer 155. Subsequently, the encoded pointer 155 can be transmitted to the client computing device 110.

Upon receipt, a decoding process 130 within the client computing device 110 can decrypt the encoded pointer 155 using the private key 135. Once decoded, the pointer having the encoded reference 160 remains. Importantly, where the pointer conforms to conventional protocols for retrieving resources of the network 115, the client computing device 110 can activate the encoded reference 160 causing the transmission of the encoded reference 160 to the server computing device 105. The encoder/decoder 120 can decrypt the encoded reference 160 using the local key 125 to produce the reference to the requested resource 165. Consequently, the server computing device 105 can forward the requested resource 165 to the client computer 110.

Figure 2:
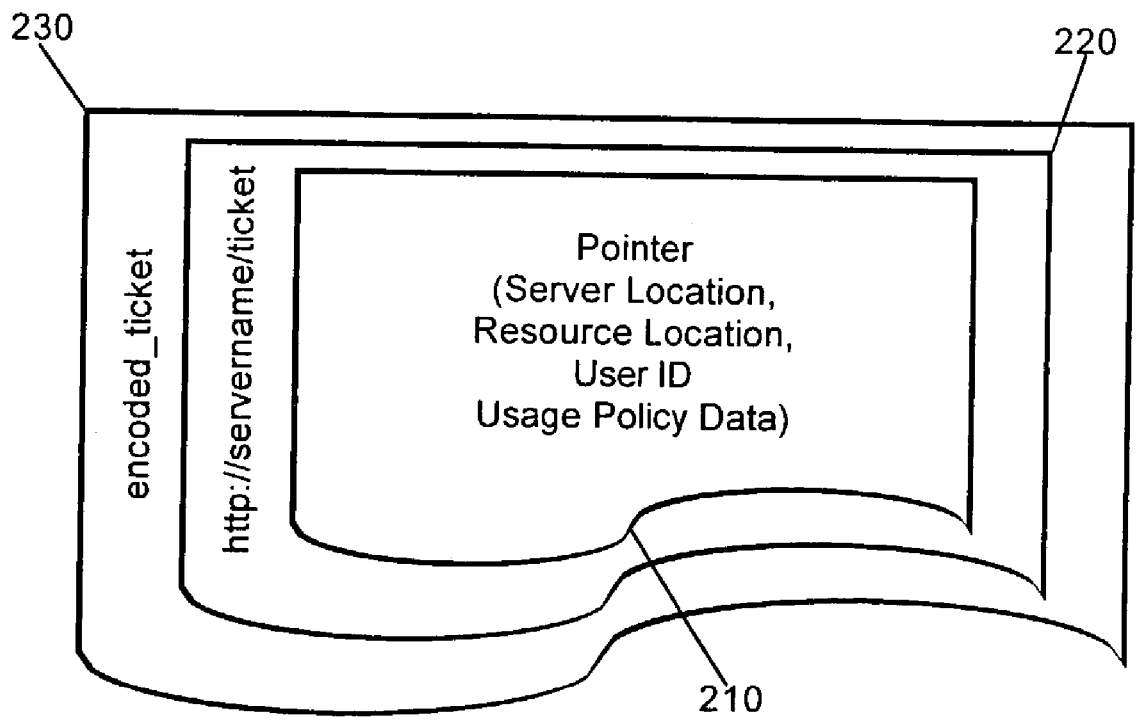
FIG. 2 is a schematic illustration of a secure pointer which has been configured in accordance with the inventive arrangements; and, FIGS. 3A-3C, taken together, illustrate a process for securely transferring a resource between client and server using the secure pointer of the present invention.

FIG. 2 is a schematic illustration of a secure pointer which has been configured in accordance with the inventive arrangements. Notably, at the heart of the secure pointer, a pointer 210 to the location of a requested resource can be included. The invention is not strictly limited to the inclusion of a location within the pointer 210, however, and other additional information can be included. As an example, a unique identifier for the user can be included, as can the name of the user, or a user ID. Moreover, usage policy data can be included in the pointer 210. The pointer 210 can be a reasonably short string in length such as five-hundred twelve bytes, though the invention is not limited to any particular string length. Finally, the pointer 210 can be encoded using the extensible markup language (XML) for the sake of portability and interoperability.

The pointer 210 can be encrypted using a local encryption key known only to the encrypting entity. Subsequently, the encrypted pointer can be combined with the network address of the encrypting entity to form a fully qualified resource locator, such as a URL. The combination can be referred to as a "ticket" 220. The ticket itself can be further encrypted using public/private key encryption to produce an encoded ticket 230. In this regard, the ticket 220 can be encrypted with the public encryption key of the target, and the encoded ticket 230 can be decrypted into the ticket 220 only with the private key of the target. Yet, the ticket 220, itself, can only be fully decoded into the pointer 210 using the local key known only to the encrypting entity.

FIGS. 3A-3C, taken together, illustrate a process for securely transferring a resource between client and server using the secure pointer of the present invention. Beginning in block 305 of FIG. 3A, a request for a resource can be received in the server computing device. In block 310, the requester can be identified, for instance through an inspection of the protocol header of the request itself. In block 315, the certificate for the requester can be retrieved from a network certificate authority. In particular, the certificate can include a public encryption key for the requestor as well as a network address for the requestor.

In block 320, a pointer to the requested resource can be constructed. The pointer can include, for example, a network and/or file system location of the requested resource. Additionally, the pointer can include usage policy data, and data relating to the identity of the requestor. Subsequently, in block 325, the pointer can be encrypted using a local encryption key known only to the server computing device. Also, in block 325, the uniform resource identifier (URI) for the server computing device can be included. In this regard, the combination of the URI and the pointer (the "ticket") can form a protocol compliant resource locator such that the activation of the resource locator using a protocol compliant browser can result in the server computing device at the address specified by the URI receiving the pointer.

In any event, in block 330, the ticket can be encrypted using the public encryption key of the requestor. In this way, only the requester will be able to decrypt the encrypted ticket using the private key of the requester. Once the ticket has been encrypted, the entire encrypted package can be forwarded to the requester. To that end, the encrypted package can be included as an attachment to an e-mail or instant message, downloaded from the server, included in an HTTP response to the requestor, or any such other transmission technique.

The secure pointer of the present invention can completely conceal the directory structure of the server computing device in a manner not possible in a conventional folder-document URL technique. This is so because the ticket itself can be encrypted so as to appear to be a garbled set of datum, incomprehensible to anyone other than the intended recipient. Also, as the message concealed within the ticket will not be visible to the public in general, the exposed interface of any underlying programmatic logic of the server computing device will not be readily apparent to an unauthorized recipient of the ticket. In this way, the deficiencies of programmatic URLs can be avoided. The same can be said of tokens additionally.

Notably, the secure pointer of the present invention can be combined with SSL over HTTPS to provide a highly secure data delivery solution. Downloadable resources such as music and audiovisual works can be enclosed in a copy-protection format and subsequently encapsulated in a secure pointer. In this way, the resources can be delivered and revealed only to authorized clients. Quite similarly, cookies can be encoded in the secure pointer to provide a secure means of communicating the cookies between authorized parties.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

The invention claimed is:

1. A method for securely distributing a requested resource to a requesting client over a computer communications network, the method comprising steps of:

identifying a public encryption key for a requesting client requesting the requested resource;

locating the requested resource;

composing a pointer to the requested resource based upon said location and encrypting said composed pointer using a local encryption/decryption key;

combining said encrypted pointer with a network address of a server coupled to a decoding processor configured to decrypt said encrypted pointer with said local encryption/decryption key to return the requested resource to the requesting client; and, encrypting said combination with said public encryption key and forwarding said encrypted combination to the requesting client;

whereby the requesting client both can decrypt said encrypted combination using a private encryption key corresponding to said public encryption key, and also can access the requested resource by transmitting said combination to said server coupled to said decoding processor.

2. The method of claim 1, further comprising the steps of:

receiving said combination in said server coupled to said decoding processor;

extracting said encrypted pointer from said combination and decrypting said encrypted pointer in said decoding processor using said local encryption/decryption key;

locating the requested resource at a location specified by said pointer; and, retrieving the requested resource at said location and forwarding said retrieved requested resource to the requesting client.

3. The method of claim 1, wherein said composing step further comprises the step of composing said pointer based upon an identity of the requesting client.

4. The method of claim 3, wherein said composing step further comprises the step of composing said pointer based upon a usage policy for the requested resource.

5. The method of claim 3, wherein said composing step further comprises the step of composing said pointer with a cookie intended for disposition in the requesting client.

6. The method of claim 1, wherein the requested resource is a multimedia resource selected from the group consisting of a music file, an image file and a video file.

7. The method of claim 1, further comprising the step of encoding said pointer using extensible markup language markup language tags.

8. The method of claim 1, wherein said forwarding step comprises the step of establishing a secured sockets layer session with the requesting client and transmitting said combination according to the hypertext transfer protocol.

* * * * *